Dec. 9, 1947.  A. P. ADAMSON  2,432,267
WINDING OF ELECTRIC MACHINES
Filed Aug. 1, 1944    3 Sheets-Sheet 1
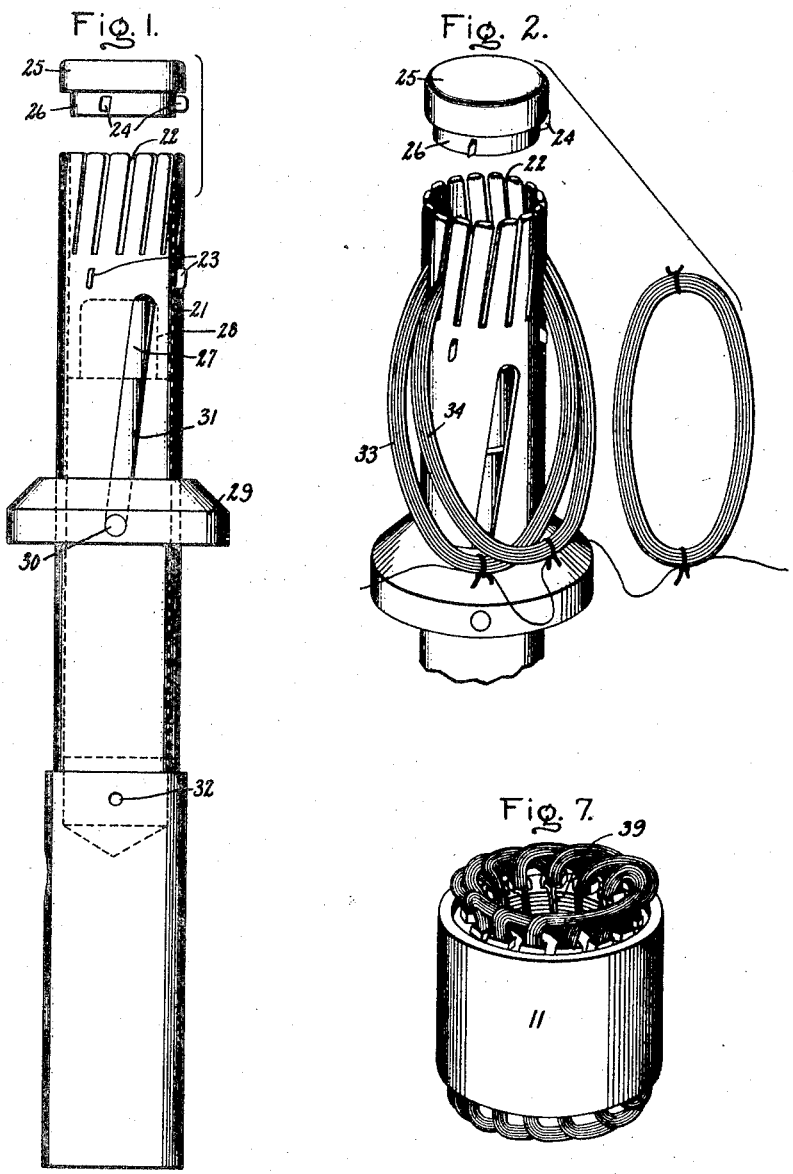
Inventor:
Arthur P. Adamson,
by Harry E. Dunham
His Attorney.

Dec. 9, 1947.  A. P. ADAMSON  2,432,267
WINDING OF ELECTRIC MACHINES
Filed Aug. 1, 1944  3 Sheets-Sheet 2
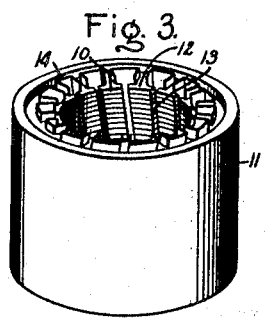
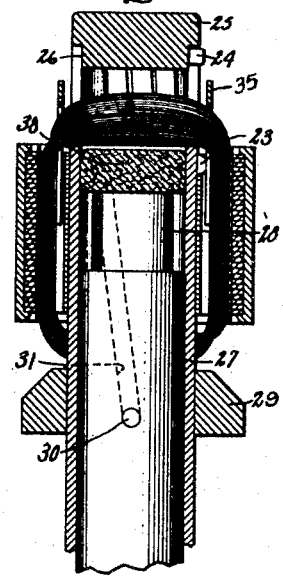
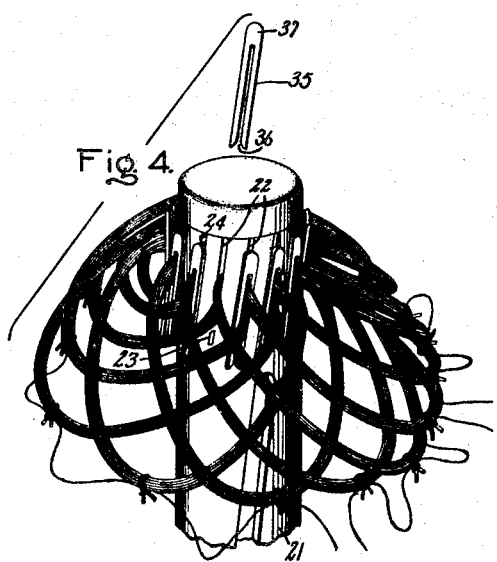
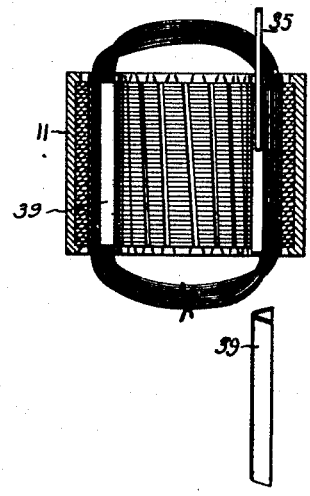
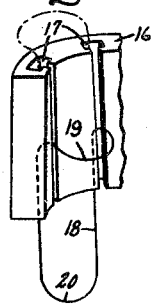
Inventor:
Arthur P. Adamson,
by Harry E. Dunham
His Attorney.

Dec. 9, 1947.  A. P. ADAMSON  2,432,267
WINDING OF ELECTRIC MACHINES
Filed Aug. 1, 1944  3 Sheets-Sheet 3
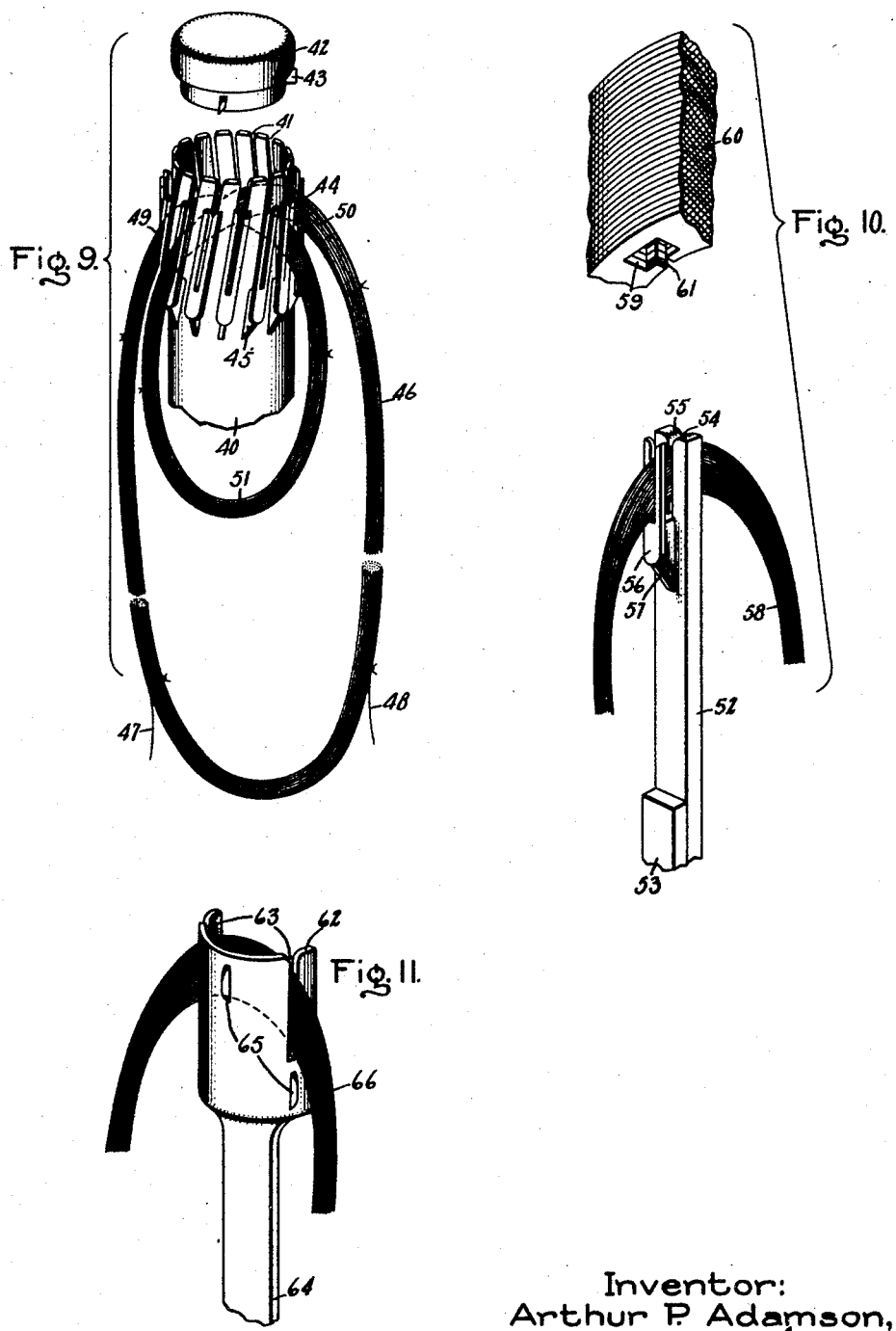
Inventor:
Arthur P. Adamson,
by Harry E. Dunham
His Attorney.

Patented Dec. 9, 1947

2,432,267

UNITED STATES PATENT OFFICE 2,432,267

WINDING OF ELECTRIC MACHINES

Arthur P. Adamson, Schenectady, N. Y., assignor to General Electric Company, a corporation of New York Application August 1, 1944, Serial No. 547,551

25 Claims. (Cl. 29—155.5)

The present application is a continuation in part of my application Serial No. 466,969, filed November 25, 1942, and relates to winding of electric machines, more specifically to the winding of slotted stators for small motors and generators, that is, the placing of coils or loops having a plurality of series connected turns into the slots of such stators or like ring-shaped elements having a bore with a plurality of spaced axially extending slots for receiving electrical conductors in the form of coils of flexible insulated wire. Each coil or loop has two sides or side portions to be placed in two spaced slots and end portions connecting the side portions.

According to present practice the prewound coils for a stator are individually placed into the stator slots. Each coil is moved axially into the bore of the stator and its sides are then moved radially outward into two spaced stator slots. This method of placing coils into stator slots is tedious and consumes considerable time in the case of stators of small, inner diameter and narrow, long slots.

One object of my invention is to provide an improved method of placing prewound coils into the slots of a stator.

Another object of my invention is to provide improved tools for carrying out said method whereby the winding of small stators may be accomplished more efficiently and economically.

For a consideration of what I believe to be novel and my invention, attention is directed to the following description and the claims appended thereto in connection with the accompanying drawings.

In the drawings Fig. 1 illustrates a side view of a tool according to my invention; Fig. 2 is a perspective view of the tool with two coils assembled thereon; Figs. 3 to 7 inclusive show a succession of steps of winding stators in accordance with my invention, Fig. 8 is an explanatory view to illustrate the principle of my invention, and Figs. 9 to 11 are perspective views of several modifications of tools embodying my invention.

As pointed out above, my invention applies primarily to the winding of stators or like elements having a cylindrical bore with a plurality of slots therein. Such a stator is shown in Fig. 3. It comprises a stack of laminations 10 suitably held in an outer ring or housing 11. The laminations have a plurality of teeth 12 forming slots 13 between adjacent teeth. The slots are rather narrow between the tips of the teeth which, as brought out above, would make it tedious to move the sides of the coils radially into the slots, especially if the stator is comparatively long and of small diameter. In the present example the length of the stator is more than an inch and its inner diameter is approximately an inch. Each slot is provided with a U-shaped insulating piece 14 to protect the insulation of the winding. The stator shown has 15 slots for receiving 15 coils of a 3-phase winding. Such winding may be formed by placing the sides of the first coil of the first phase into slots No. 1 and 8, and the second coil of the first phase into slots No. 2 and 9, etc., so that at the end two sides of different coils will be located in each slot.

The principle of my invention is diagrammatically illustrated in Fig. 8, showing a portion of a stator 16 having a bore with two axially extending slots 17 opening into the bore. A coil or closed loop with side portions 18 and end portions 19 and 20 connecting the side portions is partly inserted into the slots 17. The end portion 19 which faces the stator 16 is bent inward, that is, away from the plane of the side portions 18 into the bore of the stator to permit axial insertion of the side portions 18 into the respective slots 17. During insertion the end portion 19 moves through the bore of the stator. After the side portions 18 are completely inserted in the slots the end portion 19 is bent back, that is, radially outward into the position indicated by a dash-dotted line.

A tool for placing a coil or a set of coils into the slots is shown in Figs. 1 and 2 and comprises a cylinder 21 which has a hollow portion provided at its end with a plurality of slots 22 extending through the upper or outer edge of the hollow cylinder portion. The number and spacing of the tool slots correspond to the number and spacing of the stator slots to be wound. Thus, for placing all the coils into the slots of the stator in Fig. 3 the tool must be provided with fifteen uniformly spaced slots 22. The width of the tool slots 22 should not be greater than the width of the stator slots 13 between adjacet tooth tips 12. Preferably, the tool slots 22 are made slightly narrower than the stator slots 13 between the tips of the teeth 12. The outer ends of the tool slots are slightly wider due to the rounding of the respective corners of the cylindrical segments, thus precluding damage to the coils during insertion into the slots and facilitating the insertion of the coils. If the stator slots are skewed, as in the arrangement of Fig. 3, the tool slots 22 are skewed at the same angle, as shown in Fig. 1. The outer diameter of the slotted portion of the tool 21 is slightly less than the diameter of the bore of the stator to be wound, thus permitting the tool 21 to be axially inserted with a sliding fit into the bore of the stator. During such axial insertion it is important to preclude relative angular displacement between the stator slots and the tool slots or to maintain the respective slots in alignment. To this end the tool is provided with guide means for guiding the tool slots along the stator slots. These guide means in a preferred embodiment, as shown in Figs. 1 and 2, are in the form of two sets of circumferentially spaced ears. One set of ears 23 is secured to the outer wall of the tool 21. Each ear of such set is in alignment with a slot 22 and closely spaced from the bottom thereof. Another set of ears 24 is carried by a cap or top 25 for attachment to the end of the cylinder. The cap 25 has a portion 26 reduced in diameter and fitting into the bore of the cylinder. The wider portion of the cap has a diameter equal to that of the outer diameter of the cylinder. The ears 24 are secured to the reduced portion 26 and when the latter is inserted into the end of the cylinder the ears 24 project laterally through some of the slots 22 and upon insertion of the tool into the bore of the stator the ears 24 project radially into stator slots and thus prevent relative angular displacement between the stator slots and the tool slots or, from another angle, align each tool slot with a stator slot.

The tool has a plunger 27 with a reduced end portion 28 slidably disposed within the cylinder 21 and means for axially moving the plunger within the cylinder. This means in the present example is in the form of a collar 29 in sliding engagement with the outer wall of the cylinder 21 and secured to the plunger 27 by means of a radial pin 30. The pin 30 projects through diametrically opposed openings or recesses 31 in the wall of the cylinder. The openings 31 are skewed at the same angle as the slots 22. Relative movement between the cylinder 21 and the collar 29 causes movement of the plunger along the slots 22. The bore of the cylinder 21 has an opening 32 to permit ingress and egress of air.

The tool constitutes a device for axially inserting a coil or a set of coils into the slots of a stator. In conjunction with the stator the tool effects bending of one end portion of each coil, guiding and pulling the side portions into the stator slots. During the winding operation a coil or coils to be placed into the slots of a stator are positioned on the tool by inserting an end portion of each coil into the proper slots of the tool. Thus, in Fig. 2 I have shown two coils 33 and 34 assembled on the tool. The coil 33 to be placed in slots 1 and 7 of the stator is inserted with its end portion into the slots 1 and 7 of the tool. The second coil 34 to be placed in the stator slots 2 and 8 is placed into corresponding slots 2 and 8 of the tool, etc. until a certain number or preferably all of the coils to be placed in the stator are thus assembled in corresponding slots of the tool. Such complete assembly of the coils on the tool is illustrated in Fig. 4. The cap 25 is then attached to the end of the cylinder 21 by inserting the reduced portion 26 into the hollow end of the cylinder with the ears 24 positioned in the slots 22.

Each coil when assembled or supported on the tool has two portions projecting from slots 22. The wires of these portions near the slots are spread along the slots, thus forming flattened coil portions or bands of wire of a thickness less than the spacing of the stator teeth and adapted to be passed through and along the narrow portions of the stator slots. It is desirable to provide additional means to promote the spreading or flattening of the coil portions near the tool slots. In the present instance I have shown such means in the form of a plurality of hairpins or clips 35, one for each tool slot. Each clip is provided with a slot. It straddles and thereby flattens the two coil portions projecting through a tool slot. The clips 35 may be stamped from flat sheet material. The spacing of the legs of a clip is about equal to the width of the tool slots thus forming lateral extensions of the latter. The ends of the legs of each clip are chamfered to form a V-shaped entrance 36 into the slot of the clip to facilitate assembly of the clips. During assembly of the clips on the coils the upper end or head 37 of each clip is moved slightly radially away from the tool. In other words, each clip is positioned so that its upper end or head is slightly spaced from the adjacent surface of the tool a distance about equal to the radial thickness of the tooth tips of the stator.

The tool with the coils and clips thereon is then inserted into the stator to be wound. In doing this the set of guides on the top 25 is positioned in corresponding slots of the stator. Upon slight insertion of the tool into the stator the heads of the clips 35 enter the side portions of the slots of the stator and upon further insertion aid in guiding the side portions of the coils through the stator slots. During the first part of the insertion the tool slots are held in radial alignment with the stator slots by the ears 24 on the cap 25. After the cap 25 leaves the stator bore, alignment between the stator slots and the tool slots is maintained by the other set of ears 23. During the insertion the tool with the coils thereon is moved axially and in the particular example also rotated angularly relative to the stator. This may be accomplished by holding the stator fixed and moving the tool or vice versa. Preferably the tool with the coils thereon is held fixed on a support and the stator to be wound forced down over the tool.

After the coils are in position in the slots the clips 35 are removed from the coils and the top 25 is removed from the cylinder. Thereupon the cylinder is withdrawn from the stator. In order to prevent the coils from leaving the slots during such withdrawal, the plunger is forced into the stator against the end portions of the coils by an axial force applied to the collar 29. Preferably a soft insert or cushion 38 made of felt or like material is initially placed into the cylinder on top of the piston to prevent injury to the coils due to direct engagement with the plunger. During removal of the cylinder the plunger is held in fixed position in the stator while the cylinder is axially and simultaneously angularly displaced within and removed from the stator. This is made possible by the skewed arrangement of the slot 31 in the cylinder which constitutes a means for guiding the cylinder on the plunger during removal of the tool. After the cylinder has left the stator the plunger is drawn into the cylinder and thus removed from the stator.

The end portions of the coils which previously were located within the tool cylinder are now bent radially outward (Fig. 7). Finally, slot wedges 39 are inserted in the slots in the usual manner (Fig. 6).

The slot wedges may be partly inserted prior to the removal of the clips 35 and completely inserted upon removal of the clips 35. In some instances the clips 35 may be removed only after removal of the tool from the stator.

While the plunger aids materially to hold the coils in position during the removal of the cylinder from the stator, it might in some cases be desirable to operate the tool without the plunger. In such cases, however, special care must be taken during withdrawal of the cylinder from the stator to avoid the coils or portions thereof being forced out of the stator slots due to frictional engagement between the tool slots with end portions of the coils.

My invention may be used in connection with various kinds and forms of windings. In the arrangement illustrated in Fig. 2 the invention is used in connection with a winding consisting of one or a plurality of prewound, series-connected coils. Each coil is prewound as such before it is placed on the winding tool or coil shooter.

In many instances electrical elements, stators or rotors are provided with a winding which is formed from a skein or skeins looped in a certain manner through the slots of the stator or rotor to form a group or groups of coils, each group constituting a phase belt. In these instances the loops or coils are formed by placing different sections or parts of a skein into different slots. According to my invention a winding of this type is placed into the slots by first looping or placing the skein into the slots of a modified form of tool, as shown in Fig. 9. The tool comprises a hollow, cylindrical member 40 with a plurality of circumferentially spaced slots 41 extending through one end of the cylindrical member and a detachable cap 42 with circumferentially spaced, laterally projecting ears or guides 43 for guiding the tool along the slots of a stator. As a further means of guiding the tool and for axially spreading the windings, a plurality of slotted clips 44 are securely attached to the cylindrical member 40 in contrast to the arrangement shown in Fig. 4, in which the clips were attached to the coils only after the latter had been placed into the slots of the cylindrical member. Each clip 44, Fig. 9, is aligned with a slot 41 and opens towards the opening of the respective slot. The prongs of each clip are laterally spaced from the cylindrical surface of the member 40 and the base of each clip is secured to the cylinder 40 by a spacer 45. The width of the spacer must be slightly smaller than the width of the entrance to the slot to be wound. The radial spacing between the member 40 and the clips 44 must be slightly greater than the radial length of the narrow entrance to the slot to be wound.

Except for the permanent attachment of the clips to the cylindrical member the tool in Fig. 9 is the same in all respects to that already described. This tool like the one previously explained may be used with prewound coils or with coils or loops formed from a skein properly looped through the slots 41 of the cylindrical member 40. In the present instance I have shown a skein 46 having a plurality of turns and two free ends 47, 48 for connection into an electrical circuit. In placing the skein into the slots of the cylindrical member 40 a section 49 of the skein is placed, for example, into slots 1 and 6. A succeeding section 50 of the skein is placed into slots 2 and 7, etc. The two sections 49, 50 then form a coil or loop 51 which has a head portion or portions located within the cylindrical member 40 while the remaining portion, that is, an end portion of the loop and the sides are located outside the cylindrical member 40. A succeeding section of the skein then is placed into slots 3 and 10 until the desired number of loops or coils has been formed to constitute a phase belt. Each of the coils thus formed has a number of series connected turns, the number being equal to the number of turns of the skein and the series connection between two turns of the coil being made through the remaining portion of the respective turns of the skein. The procedure of placing the skein into the slots of the tool is the same as if the skein were placed directly into the slots of a stator except that the step of forming coils from a skein on the tool takes very little time. One or several skeins, that is, a single phase belt or a complete stator winding, may thus be placed on the tool which thereafter is moved into the stator in the manner described above. The permanent attachment of the guide clips 44 on the cylindrical member 40 assures good alignment in the stator and facilitates the sliding movement of the coil shooter into the stator because each clip spreads the coil portion along the stator slot into which it is to be placed.

When many like stators are to be wound it is always desirable to practice the method of my invention by the use of a tool, as shown in Figs. 1 and 9, whereby the entire winding or at least a complete phase belt is placed into the stator slots by a single operation. If a few stators only are to be wound the manufacture of a special tool may not be warranted. The method according to my invention then may be efficiently and economically practiced by the use of a simple tool whereby at a time a single coil only or even a side only of a coil is placed into the slot of a stator. Such simple tools are illustrated in Figs. 10 and 11. The tool of Fig. 10 comprises a bar or rod 52 secured at its lower end to a suitable handle 53, which handle might be similar to that of a screwdriver. The upper end of the bar 52 has a slot 54 extending through the end of the bar and provided with a widened, rounded entrance portion 55. A coil spreader and guide in the form of a slotted clip 56 is permanently secured to the bar 52 by means of a spacer 57. The slot of the clip 56 is aligned with the slot 54 of the bar and opens towards the opening of the latter. A coil 58 to be placed into the slot of a stator is positioned in the slots of the bar and the clip. To place a side or portion of the coil into the slot 59 of the stator 60 the clip 56 is slid into one end of such stator slot while the bar 52 is moved through the bore of the stator. During such operation the clip 56 engages wall portions 61 of the slot and precludes the bar 52 from moving radially away from the slot. After one side of the coil has been placed into a slot the other side of the coil is placed into another slot of the stator. This may be done from either end of the stator. If the coil is formed by a part of a skein it is preferable to insert the second side from the opposite end of the stator.

The tool of Fig. 11 has a wall 62 which forms part of a cylinder with two circumferentially spaced axial slots 63 extending through one end of the wall 62. The other end of the wall is secured to a suitable handle 64. The wall has laterally projecting pins or guides 65 for guiding the tool along the slots of a stator or like element to be wound. During operation of the tool the end of a coil or skein section 66 is passed through the slots 63 whereupon the tool with the coil thereon is passed into the bore of a stator. The guides 65 during such operation slide along stator slots, the end of the coil passes through the bore of the stator while the sides of the coil are moved along the stator slots.

Thus, with my invention I have accomplished an improved method and apparatus for placing coils into stator slots. The arrangement according to my invention is simple in design, its use does not require great skill, and permits a considerable reduction of the time which has heretofore been necessary for winding small stators.

Having described the method according to my invention, together with the apparatus for carrying out the method, I wish to have it understood that changes may be made in both the apparatus and the method without departing from the spirit of my invention and the scope of the appended claims.

What I claim as new and desire to secure by Letters Patent of the United States is:

1. The method of winding a stator having a bore with circumferentially spaced slots, which method comprises forming a coil having side and end portions, bending one of the end portions inward near its connection with the side portions, axially inserting the side portions into two slots with the bent end portion leading, and upon complete insertion bending said end portion outward.

2. The method of winding a stator having a bore with circumferentially spaced slots, which method comprises forming a coil having side and end portions comprising a plurality of turns, placing one end of each side into the entrance of a slot with one end portion facing the bore of the stator, axially moving the coil relative to the slots to cause the sides to pass through the respective slots and the end portion to pass through the bore, and upon complete insertion bending the end portion outward.

3. The method of winding a stator having a bore with circumferentially spaced slots, which method comprises producing a plurality of coils each comprising a plurality of turns, bending an end portion of each coil inward, positioning the coils relative to each other, simultaneously axially inserting the positioned coils into the slots with the sides of each coil passing axially through two slots and the bent end portions passing through the bore of the stator, and subsequently bending the end portions outward.

4. The method of winding a stator according to which a plurality of series connected coils each having a plurality of series connected turns to be placed into the stator slots are simultaneously axially inserted into the ends of the slots with one end portion of each coil passing through the bore of the stator, and after insertion said end portions are bent outward.

5. A tool for winding an electric stator having a plurality of slots, said tool comprising a cylinder of a diameter smaller than the inner diameter of such stator, an end portion of the cylinder forming a plurality of slots equal to the number of stator slots to be wound and of a width not greater than the width of the stator slots, and means for guiding the cylinder along such stator slots.

6. A tool for winding an electric stator comprising a hollow cylinder having an end portion with a plurality of spaced slots, the number and spacing of the slots conforming to the number and the spacing of the stator slots to be wound, and means for guiding the cylinder through the bore of the stator being wound to maintain alignment between the cylinder slots and the stator slots.

7. A tool for winding an electric stator comprising a hollow cylinder, a plurality of spaced slots formed at one end of the cylinder, the number and spacing of the slots conforming to the number and the spacing of the stator slots to be wound, and means for guiding the cylinder through the bore of the stator being wound, said means comprising a plurality of circumferentially spaced ears projecting laterally from the cylinder.

8. A tool for winding an electric stator comprising a hollow cylinder, a plurality of spaced slots formed at one end of the cylinder, and means on the cylinder for guiding it through the bore of the stator being wound, said means comprising a plurality of circumferentially spaced ears, each ear being in alignment with and axially spaced from a slot.

9. A tool for winding an electric stator comprising a hollow cylinder, a plurality of spaced slots formed at one end of the cylinder, means on the cylinder for guiding it through the bore of a stator being wound, said means comprising two sets of circumferentially spaced ears, the ears of one set being formed on the cylinder near the bottom of the slots, and means for detachably supporting the other set near the entrance of the slots.

10. A tool for winding an electric stator comprising a cylinder having an end portion for insertion into the bore of such stator, said end portion having a plurality of spaced slots, means for guiding the cylinder through a stator bore to prevent relative angular movement between the cylinder slots and the stator slots, and a plunger movably disposed within the cylinder.

11. A tool for winding an electric stator comprising a cylinder having an end portion for insertion into the bore of such stator, said end portion having a plurality of slots corresponding in spacing and numbers to the spacing and numbers of the stator slots to be wound, means for guiding the cylinder through the stator bore to prevent relative angular movement between the cylinder slots and the stator slots, a plunger slidable within the cylinder, and a sliding collar surrounding the cylinder and secured to the plunger.

12. A tool for winding an electric stator comprising a cylinder having an end portion for insertion into the bore of such stator, said end portion having a plurality of slots corresponding in spacing and numbers to the spacing and numbers of the stator slots to be wound, means for guiding the cylinder through the stator bore to prevent relative angular displacement between the cylinder slots and the stator slots, an axial opening in the cylinder wall, a plunger within the cylinder, a sliding collar surrounding the cylinder, and means projecting through said opening to secure the plunger to the collar.

13. A tool for placing a plurality of coils into the slots of a stator, said tool comprising a cylinder having an end portion with a plurality of uniformly spaced slots, two sets of circumferentially spaced guides to maintain alignment between the stator slots to be wound and the tool slots during relative axial movement between them, one set of guides being secured to the cylinder and slightly spaced from the ends of and in alignment with some of the cylinder slots, a cap for attachment to the top of the cylinder, said cap having a portion reduced in diameter fitting into the bore of the cylinder, the second set of guides being carried by said reduced portion, and a plurality of slotted clips for attachment to two coils near said slots to spread such coils along the slots.

14. A tool for placing a plurality of coils into the skewed slots of a stator, said tool comprising a cylinder having a hollow end portion with a plurality of skewed slots therein, means for radially aligning the tool slots with such stator slots, and means for supporting coils in such stator slots during withdrawal of said cylinder from the stator, said means including a plunger slidably disposed in the cylinder and a radial pin fastened to the plunger and slidably projecting through a recess in the cylinder, which recess is skewed at the same angle as the cylinder slots.

15. The method of winding an electrical machine having a cylindrical element with circumferentially spaced slots extending through the ends of the cylindrical element and opening into the cylindrical surface thereof, which method comprises forming a multi-turn coil having side and end portions, bending one end portion away from the plane of the side portions near its connection with the side portions, axially inserting the side portions into two slots with the bent end portion leading and facing away from the cylindrical surface of said element, and upon complete insertion bending said end portion towards the plane of the side portions.

16. A tool for placing a coil into two parallel slots of an electrical machine element, said tool having a wall, means projecting from the wall for entering the slots of the machine element to align the tool with said slots, and means formed on the wall to space the side portions of the coil in accordance with the spacing of the slots into which such coil is to be placed.

17. A tool for winding an electric stator having a plurality of slots, said tool comprising a hollow member having an end portion forming a plurality of slots equal to the number of stator slots to be wound and spaced in accordance with the spacing of the stator slots, the tool slots having a width not greater than the width of the stator slots.

18. A tool for winding an electric machine element having a cylindrical surface with parallel slots extending through the entire length of the element and opening into the cylindrical surface, said tool having a wall forming two parallel slots opening through an edge of the wall and adapted to be brought into alignment with the slots to be wound, the tool slots having a width slightly smaller than the width of the slots to be wound and projections extending from the wall for entering slots of the machine element to guide the tool and to maintain its slots in alignment with the slots to be wound.

19. The method of winding an electrical machine having a cylindrical element with circumferentially spaced slots extending through the ends of the cylindrical element and opening into the cylindrical surface thereof, which method comprises forming a plurality of multi-turn coils each having side portions and a first and a second end portion, connecting the second end portion of each coil in series with the second end portion of another coil, bending the first end portion of each coil away from the plane of the side portions near its connection with the side portions, axially inserting the side portions into the slots with the first end portions leading and facing away from the cylindrical surface of said element, and upon complete insertion bending one of the end portions of each coil towards the plane of its side portions.

20. The method of winding an electrical conductor on an electrical machine having an element with a plurality of spaced slots which comprises forming a skein of the conductor, looping the skein external the machine to form a group of coils, having sides and end portions, and simultaneously axially inserting the sides of the coils into said slots with the end portions disposed at an angle to the side portions.

21. The method of winding an electrical conductor on an electrical machine having an element with a plurality of spaced slots which comprises producing a skein of the conductor, axially inserting a portion of the skein through an end of one of the slots, and axially inserting another portion of the skein through an end of another slot.

22. The method of winding an electrical conductor on an electrical machine having an element with a plurality of spaced slots which comprises producing a skein of the conductor, axially inserting a portion of the skein through an end of one of the slots, and axially inserting another portion of the skein through an end of another slot, the two portions of the skeins being axially inserted in opposite directions into the respective slots.

23. A tool for placing a coil into spaced slots of a stator comprising a member having a cylindrically-shaped wall, circumferentially spaced slots extending through one end of the wall, lateral projections on the wall engageable in grooves in the stator for guiding said member, and a handle attached to an end of the wall.

24. A tool for placing a coil into a slot of an electrical machine element, said tool comprising a bar having a forked end comprising two projecting and substantially parallel spaced strips, said strips being provided with open-ended registering slots adapted to receive and hold in flattened relation a portion of said coil to permit easy insertion into said slot of the portion of said coil held between said strips.

25. A tool for inserting a plurality of coils into slots of an electrical machine element, said tool comprising a tubular member having one end provided with a plurality of open-ended slots, a plurality of supporting and guiding members radially spaced from and concentric with said tubular member, said guiding members being provided with a plurality of open-ended slots equal in number to and lying in registration with the slots in said tubular member, said slotted guiding and tubular members being adapted to receive and hold in flattened relation a plurality of coils for insertion into said slots and said guiding members being adapted for insertion into said slots to guide the tool during the coil inserting operation.

ARTHUR P. ADAMSON.

REFERENCES CITED

The following references are of record in the file of this patent:

UNITED STATES PATENTS

| Number | Name | Date |
|---|---|---|
| 1,934,903 | Apple | Nov. 14, 1933 |
| 1,402,217 | Cullin | Jan. 3, 1922 |
| 1,661,344 | Poole | Mar. 6, 1928 |
| 1,555,931 | Apple | Oct. 6, 1925 |
| 1,557,259 | Leland et al. | Oct. 13, 1925 |
| 1,622,319 | Jenkins | Mar. 29, 1927 |